(12) United States Patent
Onishi

(10) Patent No.: US 6,413,453 B1
(45) Date of Patent: Jul. 2, 2002

(54) MOTOR-DRIVEN MOLD CLAMPING DEVICE AND MOLD CLAMPING METHOD

(75) Inventor: Masashi Onishi, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/335,924

(22) Filed: Jun. 18, 1999

(30) Foreign Application Priority Data

Jun. 18, 1998 (JP) .......................................... 10-171383

(51) Int. Cl.⁷ .............................................. B29C 45/76
(52) U.S. Cl. .................... 264/40.5; 264/328.1; 425/149; 425/593
(58) Field of Search ................................ 425/150, 135, 425/593, 149, 451.6; 264/40.1, 40.5, 328.1

(56) References Cited

U.S. PATENT DOCUMENTS

| | | | |
|---|---|---|---|
| 4,642,044 A | * 2/1987 | Ishikawa et al. | 425/593 |
| 5,027,044 A | * 6/1991 | Nishimura et al. | |
| 5,279,778 A | * 1/1994 | Taira et al. | 425/593 |
| 5,469,038 A | * 11/1995 | Silvey | 425/135 |
| 5,639,415 A | * 6/1997 | Kato et al. | |
| 5,792,483 A | * 8/1998 | Siegrist et al. | 425/135 |

FOREIGN PATENT DOCUMENTS

| JP | 1-22135 | 4/1989 |
|---|---|---|
| JP | 9-164571 | 6/1997 |

* cited by examiner

*Primary Examiner*—James P. Mackey
(74) *Attorney, Agent, or Firm*—Arent Fox Kintner Plotkin & Kahn

(57) ABSTRACT

A motor-driven mold clamping device includes a toggle mechanism for advancing and retracting a movable platen toward and away from a fixed platen, and a servo motor adapted to drive the toggle mechanism via a ball screw mechanism. The toggle mechanism, the movable platen, and the fixed platen are configured such that a mold clamping force is controlled with a knicking in the toggle mechanism being in a predetermined range such that the servo motor is driven with a current which is controlled to be at or near a rated current therefore, in order to maintain the mold clamping force. A method of controlling mold clamping force includes the steps of providing the toggle mechanism, and the servo motor as discussed above, and controlling the mold clamping force by appropriately configuring the knicking in the toggle mechanism to be in a predetermined range such that the servo motor is driven with a current which is at or near a rated current.

14 Claims, 5 Drawing Sheets

MOTOR-DRIVEN MOLD CLAMPING DEVICE AND MOLD CLAMPING METHOD

BACKGROUND OF THE INVENTION

1. Field of the Invention

The present invention relates to an improvement of a motor-driven mold clamping device for a motor-driven injection molding machine as well as to an improved mold clamping method.

2. Description of the Related Art

Motor-driven injection molding machines have gradually replaced hydraulic machines, and have increasingly been used in recent years. One reason lies in their simple configuration as compared with the hydraulic injection molding machines because of the lack of need of a hydraulic pump, hydraulic tubes and valves. In addition, servo motors used for the source of power allows the easier control of the motor-driven injection molding machines. The servo motors are used in most cases for an injection device and a mold clamping device.

As far as mold clamping devices are concerned, it is often based on a toggle system. The toggle system uses a toggle mechanism to double the force generated by the servo motor which is then transmitted to a mold by means of a toggle link. These types of mold clamping devices are undergoing changes and refinements. An example of an improved toggle-operated mold clamping device is disclosed in Japanese Patent Publication No. 1-22135. The disclosed mold clamping device comprises a servo motor and a position detector for detecting a rotation position of the servo motor. The mold clamping device further comprises a conversion mechanism for converting the rotation movement of the servo motor into a linear movement. The conversion mechanism has a ball screw mechanism. The conversion mechanism is used for driving the toggle mechanism and the position detector detects a position of a movable mold, to carry out control operation of the mold clamping. Upon the mold clamping, the servo motor is driven with a microcurrent flowing therethrough.

For the toggle mechanism, the reason the microcurrent is used is to generate a sufficient clamping force with the phenomenon known as knicking reduced as much as possible. This provides a large toggle magnification factor and thus allows a smaller output of the servo motor. The mold clamping devices using the toggle mechanism of the type described advantageously require only a small electric power consumption. As will be described more in detail below, the smaller the knicking is, the shorter the distance from the dead point of the toggle mechanism.

However, the smaller knicking results in a larger effect of a frictional force on junctions and contacted portions of mechanical parts forming the mold clamping device. This therefore increases an operational hysteresis. Such a large operational hysteresis has an adverse effect on the accuracy of control for the mold clamping force provided by the servo motor.

SUMMARY OF THE INVENTION

Therefore, an object of the present invention is to improve the accuracy of control for the mold clamping force while reducing the effect of a frictional force on junctions and contacted portions of mechanical parts forming the mold clamping device.

A motor-driven mold clamping device according to the present invention comprises a toggle mechanism for use in advancing and retracting a movable platen; and a servo motor adapted to drive the toggle mechanism via a ball screw mechanism.

According to an aspect of the present invention, the motor-driven mold clamping device controls a mold clamping force with a knicking in the toggle mechanism being in a predetermined range and the servo motor driven with a current which is not smaller than 20% of a rated current therefor.

A method for clamping a mold in a motor-driven manner according to the present invention clamps the mold by means of a toggle mechanism operated by a servo motor. In this method a mold clamping force is controlled with a knicking in the toggle mechanism being in a predetermined range and the servo motor driven with a current which is not smaller than 20% of a rated current therefor.

BRIEF DESCRIPTION OF THE DRAWINGS

For a more complete understanding of the present invention, reference should be made to the appended drawings, wherein.

DETAILED DESCRIPTION OF THE PREFERRED EMBODIMENTS

Figure 1:
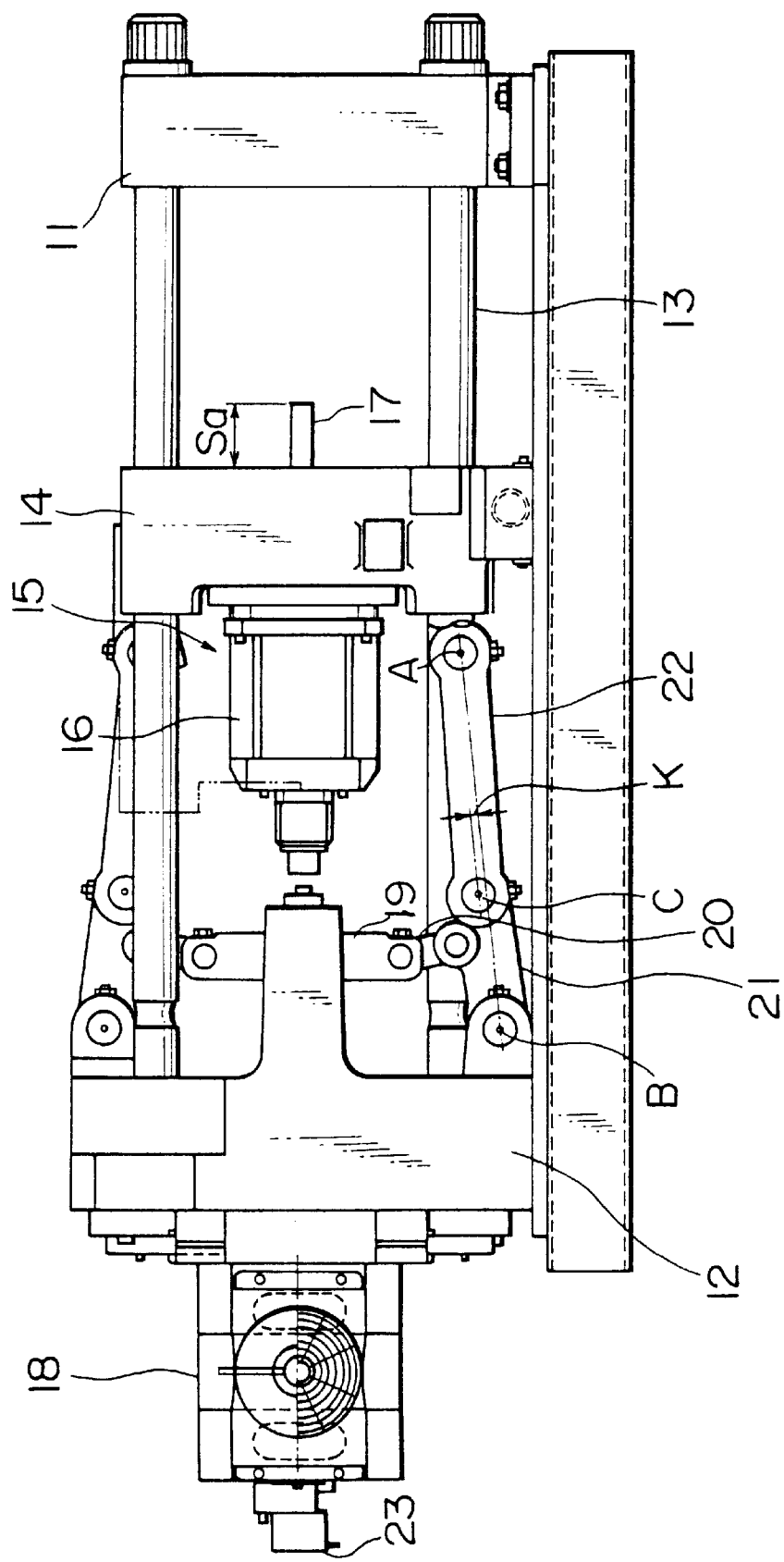
FIG. 1 is a view illustrating a configuration of a motor-driven mold clamping device to which the present invention is applied.

FIG. 1 illustrates a motor-driven mold clamping device to which the present invention is applied. In FIG. 1, a mold clamping device comprises a fixed platen 11 and a toggle support 12. Four tie bars 13 (two of which are illustrated in the figure) are provided between the toggle support 12 and the fixed platen 11. A movable platen 14 is opposed to the fixed platen 11 such that the movable platen 14 can freely be advanced and retracted along the tie bars 13. A fixed mold (not shown) is attached to the surface of the fixed platen 11 that is opposed to the movable platen 14. Likewise, a movable mold (not shown) is attached to the surface of the movable platen 14 that is opposed to the fixed platen 11.

An ejector pin feeder 15 is provided at the rear end of the movable platen 14. The ejector pin feeder 15 is for pushing ejector pins (not shown) in order to eject a molded product. In the ejector pin feeder 15, a servo motor 16, used for ejection, advances and retracts an ejector rod 17 by stroke Sa.

A toggle mechanism is provided between the toggle support 12 and the movable platen 14. A servo motor 18 for mold clamping is driven to advance and retract crosshead 19 to generate a mold clamping force multiplied by a toggle magnification factor. This mold clamping force is used to advance the movable platen 14 (in the right direction in FIG. 1) to achieve the mold clamping.

The toggle mechanism is formed of toggle levers 20 and 21 and a toggle arm 22. The toggle lever 20 is pivotally supported on the crosshead 19. The toggle lever 21 is pivotally supported on the toggle support 12. The toggle arm 22 is pivotally supported on the movable platen 14. The toggle lever 20 is linked to the toggle lever 21. The toggle lever 21 is linked to the toggle arm 22. A rotary encoder 23 is provided in the servo motor 18 to detect the position of the crosshead 19 (hereinafter, referred to as a crosshead position). The rotary encoder 23 detects the crosshead position by directly detecting the rotation speed of the servo motor 18.

Now, the concept of knicking will be described. Assume a line segment between the fulcrum B on the toggle lever 21 and the point of application A on the toggle arm 22 in the toggle mechanism. Assume another line segment which is parallel to the above-mentioned line segment AB and which passes the fulcrum on the toggle arm 22, that is, the junction C between the toggle lever 21 and the toggle arm 22. A distance K between these two line segments are referred to as the knicking or knicking distance. Therefore, the smaller the knicking K is, the shorter the distance from the dead point of the toggle mechanism.

The mold clamping device of the type described is disclosed in Japanese Patent Application No. 7-327017 (corresponding to Japanese Patent Laid-open No. 9-164571). The device as disclosed in this patent application is what is referred to as a "built-in driving type" and one feature thereof is that no additional drive mechanisms such as a belt is needed for the transmission of the driving force.

Figure 4:
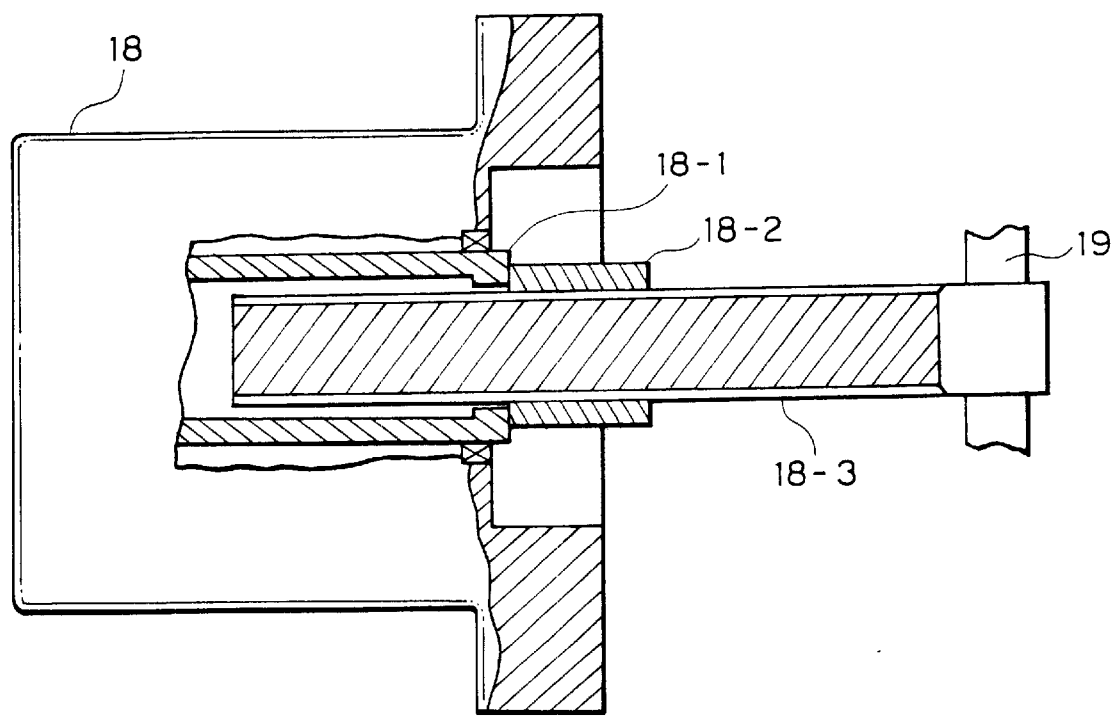
FIG. 4 is a partial sectional view for describing a ball screw mechanism which is used in the motor-driven mold clamping device illustrated in FIG. 4.

Referring to FIG. 4, the ball screw mechanism is described in brief. The servo motor 18 has a hollow output shaft 18-1. A ball nut 18-2 is fixed to an end portion of the hollow output shaft 18-1. A ball screw shaft 18-3 is engaged with the ball nut 18-2 and is inserted into the hollow portion of the hollow output shaft 18-1. The crosshead 19 is attached to an end portion of the ball screw shaft 18-3. Thus, the rotation motion of the hollow output shaft 18-1 is converted into the reciprocating motion of the crosshead 19 through the ball nut 18-2.

Figure 2:
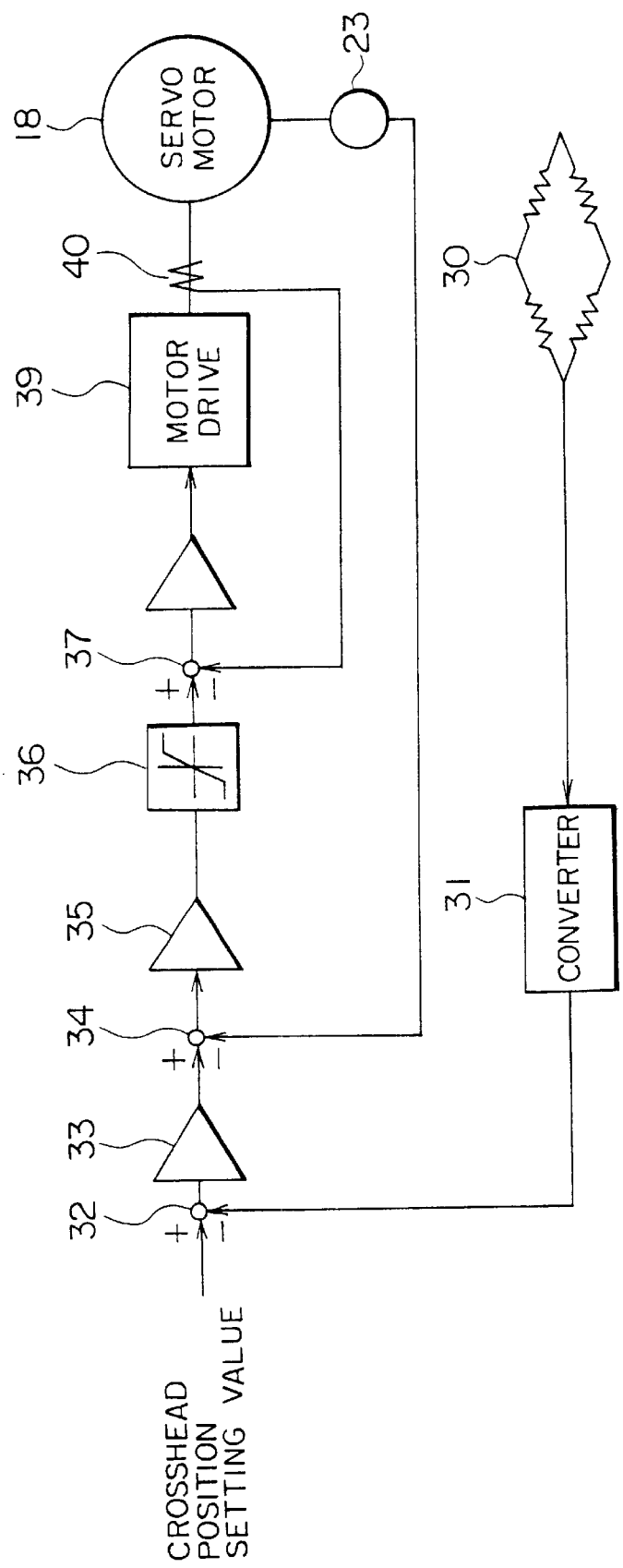
FIG. 2 is a block diagram illustrating a configuration of a mold clamping force feedback control system used in the present invention.

Referring to FIG. 2, a mold clamping force feedback control system is described. A strain gage 30 is provided on any one of the four tie bars 13 shown in FIG. 1. Strain gage 30 detects the mold clamping force by detecting a strain exerted on the tie bar 13 as the clamping proceeds. The detected mold clamping force is converted into a positional amount of the crosshead position in a converter 31. The converted positional amount of the crosshead is supplied to a subtracter 32. The subtracter 32 calculates a difference between a value of the converted positional amount of the crosshead and a crosshead position setting value supplied from a setting unit (not shown). The subtracter 32 supplies the subtraction result to a position control amplifier 33 as a difference signal. The position control amplifier 33 amplifies the received difference signal into a signal suitable for a velocity feedback system and supplies it as an amplified signal to a subtracter 34. The subtracter 34 calculates a difference between the amplified signal and a velocity feedback signal supplied from the rotary encoder 23. The subtracter 34 then supplies the subtraction result to a velocity amplifier 35 as a difference signal. The velocity amplifier 35 amplifies the received difference signal into a signal suitable for a current feedback system. The velocity amplifier 35 then supplies the amplified signal to a subtracter 37 via a limiter 36 which restricts the upper and lower limits of the amplified signal. The subtracter 37 calculates a difference between the signal supplied from the velocity amplifier 35 and a current feedback signal from a current detector 40 which detects an output current from a motor drive 39. The subtracter 37 then supplies a signal indicative of the calculated difference to a current amplifier 38. The current amplifier 38 supplies a current command value for the servo motor 18 to the motor drive 39.

As described above, the mold clamping device controlled by the mold clamping force feedback control system is known to have the following problem. The ball screw in the ball screw mechanism receives no reaction force of the mold clamping force when the clamping is performed with the toggle lever 21 and the toggle arm 22 extending almost completely, that is, with the smallest possible knicking. The reaction force is taken up by toggle lever 21 and toggle arm 22, rather than being transferred to the ball screw. Receiving no reaction force means only a small electric power is required for the servo motor 18. However, the small knicking results in a large effect of a frictional force on the junctions and the contacted portions of the mechanical parts forming the mold clamping device, which increases the operational hysteresis of the device.

Figure 3:
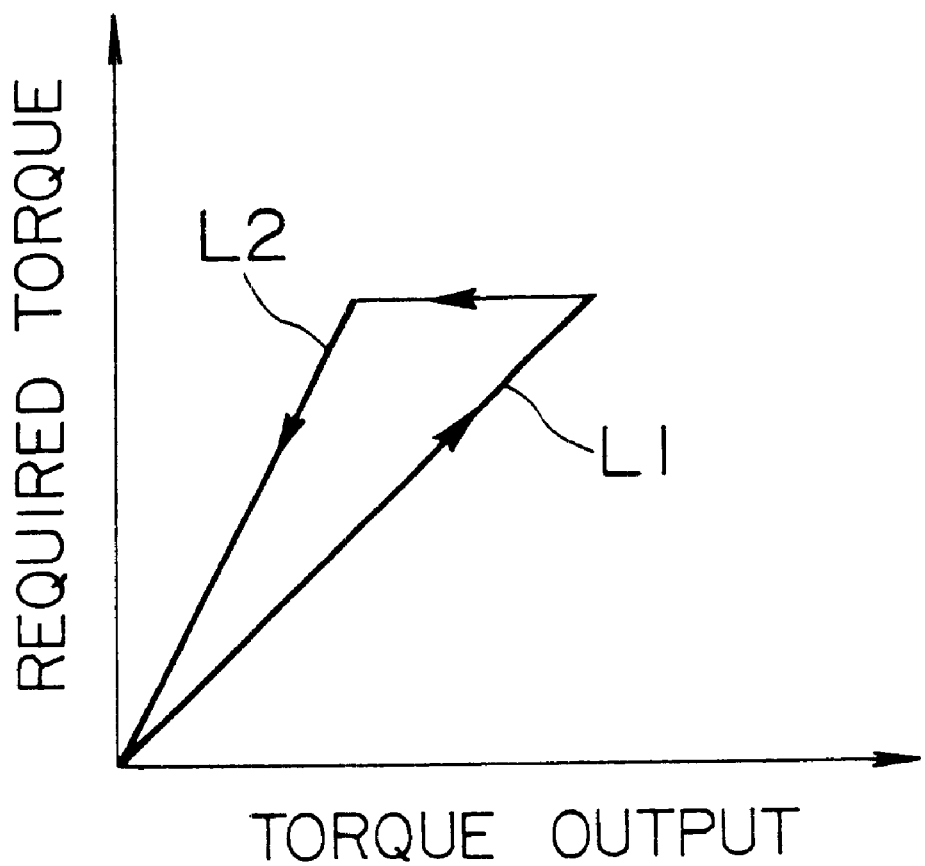
FIG. 3 shows a characteristic curve illustrating a hysteresis during the control for a mold clamping force.

This large operational hysteresis increases torque through a straight line L1 as shown in FIG. 3 because the frictional force acts as a resistance during the mold closing operation. On the other hand, the frictional force helps the torque to be reduced through a straight line L2 during the mold opening operation. As a result, the torque has a non-linear characteristic curve, and the control performance is deteriorated. Therefore, it is not possible to dynamically control the mold clamping force when the device has a small knicking K. Again as described above, it has an adverse effect on the accuracy of control for the mold clamping force provided by the servo motor 18.

A feature of the present invention lies in the timing of the mold clamping. The present invention performs the mold clamping with the toggle lever 21 and the toggle arm 22 not being extended completely, that is, with a relatively large knicking K. In this state, the servo motor 18 is required to be supplied with a higher electric current which is at or near the rated current value for the motor. Although power requirements are therefore increased, this brings some significant advantages including, but not limited to, the effect of the frictional force being reduced and that it becomes easier to control the mold clamping force with the higher accuracy.

Figure 5:
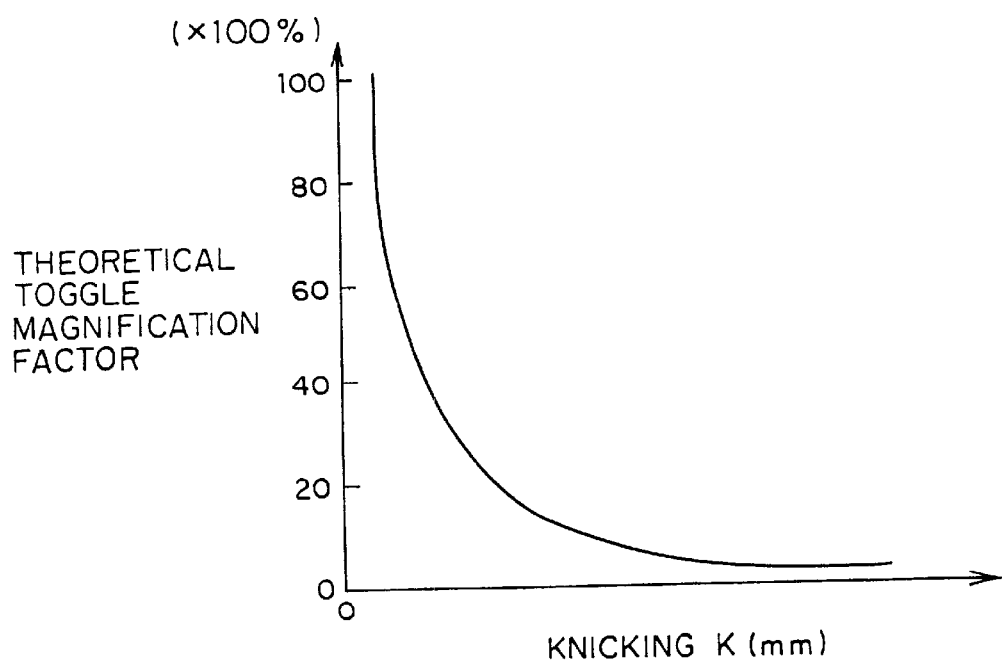
FIG. 5 is a characteristic for describing the relation between a theoretical toggle magnification factor and a knicking K in the toggle mechanism.

Referring to FIG. 5, the description will be made with respect to the relation between a theoretical toggle magnification factor and the knicking K in the toggle mechanism. Generally, the toggle mechanism has a characteristic as shown in FIG. 5. In FIG. 5, if the knicking K approaches the zero, the theoretical toggle magnification factor approaches the infinity. This means that, if the knicking K is a small value, it is possible to obtain a sufficient mold clamping force, even if the servo motor 18 is driven with a small current smaller than the rated current. In the embodiment, the toggle mechanism is used within a range of 20 through 80 in the theoretical toggle magnification factor. This is because the following reason. If the toggle mechanism is used with a large theoretical toggle magnification factor, the operational hysteresis becomes large and the accuracy of control for the mold clamping force is deteriorated. When the toggle mechanism is used within the range of 20 through 80, it is required that the servo motor 18 is driven with the current near to the rated current. However, it is possible to control easily the mold clamping force because the operational hysteresis becomes small.

The servo motor 18 may be driven with a current which is not smaller than 20% of a rated current therefor. It is preferable that the servo motor 18 is driven with the current which is at least 70% of the rated current.

In addition, the value of the knicking K is determined by the theoretical toggle magnification factor which is used for the toggle mechanism. If the size of the toggle lever 21 and the toggle arm 22 in the toggle mechanism is changed, the value of the knicking K is also varied. This means that the value of the knicking K is varied with the size of the toggle mechanism. For example, the value of the knicking K is determined within a predetermined range of 5 through 10 (mm). However, the present invention is no limited by the above range. A rated output of the servo motor 18 is determined by the required mold clamping force, the theoretical toggle magnification factor, a lead of the ball screw shaft 18-3, and so on.

While the preferred embodiments of the present invention have thus been described for the case where the present invention is applied to the built-in type motor-driven mold clamping device, the present invention is also applicable to other types of the motor-driven mold clamping devices.

As described above, according to the present invention, it is possible to control the mold clamping force with high accuracy while reducing the adverse effect of the frictional force between the mechanical parts of the mold clamping device by means of controlling the mold clamping force with a relatively large knicking.

Numerous modifications may be apparent to one of skill in the art, while remaining within the spirit and scope of the invention. To determine the scope of the invention, reference should be made to the appended claims.

What is claimed is:

1. A motor-driven mold clamping device comprising:
   a toggle mechanism for advancing and retracting a movable platen toward and away from a fixed platen; and
   a servo motor adapted to drive said toggle mechanism via a ball screw mechanism, wherein
   the toggle mechanism, the movable platen, and the fixed platen are configured such that a mold clamping force is controlled with a knicking in the toggle mechanism being in a predetermined range such that said servo motor is driven with a current which is not smaller than 20% of a rated current therefor, in order to maintain the mold clamping force.

2. A motor-driven mold clamping device as claimed in claim 1, wherein said servo motor is driven with the current of at least 70% of said rated current.

3. A motor-driven mold clamping device comprising:
   a toggle mechanism for advancing and retracting a movable platen toward and away from a fixed platen; and
   a servo motor adapted to drive said toggle mechanism via a ball screw mechanism, wherein
   the toggle mechanism, the movable platen, and the fixed platen are configured such that a mold clamping force is controlled with a knicking in the toggle mechanism being in a predetermined range such that said servo motor is driven with a current which is sufficiently high so as to be at or near a rated current therefor, in order to maintain the mold clamping force.

4. A motor-driven mold clamping device as claimed in claim 3, further comprising:
   a detector for detecting the mold clamping force, said detector being disposed at a position where the mold clamping force is exerted; and
   a mold clamping force feedback control system for controlling said servo motor depending on the mold clamping force detected by said detector to thereby control the mold clamping force.

5. A motor-driven mold clamping device as recited in claim 4, wherein said movable platen is movable along a tie bar, and wherein said detector is disposed on said tie bar to detect a strain thereupon.

6. A motor-driven mold clamping device as recited in claim 5, wherein said detector comprises a strain gauge disposed on the tie bar.

7. A motor-driven mold clamping device as recited in claim 5, wherein said mold clamping force feedback control system comprises a converter for converting an output of the detector into a positional amount value;
   a first subtracter for subtracting the positional amount value from a set value;
   a rotary encoder for detecting a speed of the servo motor, said rotary encoder providing a signal to a second subtracter, said second subtracter determining a difference between an amplified output of the first subtracter and the output signal of the rotary encoder;
   a third subtracter for calculating a difference between an amplified output of the second subtracter and a motor drive current; and
   motor control means for driving the servo motor based upon an amplified output of the third subtracter, thereby controlling the mold clamping force.

8. A method for clamping a mold in a mold clamping device having a toggle mechanism, said method comprising the steps of:
   providing a toggle mechanism for advancing and retracting a movable platen toward and away from a stationary platen; and
   providing a servo motor adapted to drive the toggle mechanism via a ball screw mechanism;
   controlling a mold clamping force by configuring a knicking in the toggle mechanism to be in a predetermined range such that the servo motor is driven with a current which is not smaller than 20% of a rated current therefor, thereby maintaining the mold clamping force at a preselected value.

9. A method as recited in claim 8, wherein said servo motor is driven with the current of at least 70% of said rated current.

10. A method for clamping a mold in a mold clamping device having a toggle mechanism, said method comprising the steps of:
    providing a toggle mechanism for advancing and retracting a movable platen toward and away from a stationary platen; and
    providing a servo motor adapted to drive the toggle mechanism via a ball screw mechanism;
    controlling a mold clamping force by configuring a knicking in the toggle mechanism to be in a predetermined range such that the servo motor is driven with a current which is controlled to be at or near a rated current therefore, thereby maintaining the mold clamping force at a preselected value.

11. A method as recited in claim 10, wherein the step of controlling the mold clamping force is performed by performing a feedback control of current to the servo motor, said feedback control being based upon a detected mold clamping force and a detected servo motor input current.

12. A method as recited in claim 11, wherein said step of controlling the mold clamping force comprises a step of calculating a position of a driven member of the toggle mechanism, said feedback control being based upon the calculated position of the driven member.

13. A method for clamping a mold in a motor-driven manner by means of a toggle mechanism operated by a servo motor, comprising the step of controlling a mold clamping force with a knicking in the toggle mechanism being in a predetermined range and the servo motor driven with or around a rated current therefor.

14. A method as claimed in claim 13, wherein the step of controlling the mold clamping force is carried out by a mold clamping force feedback control system for controlling said servo motor depending on the mold clamping force detected by a mold clamping force detector disposed at a position where the mold clamping force is exerted.

* * * * *